(12) United States Patent
Rieger et al.

(10) Patent No.: US 7,025,708 B2
(45) Date of Patent: Apr. 11, 2006

(54) METHOD FOR CHANGING THE CLUTCH TORQUE IN A CLUTCH IN THE POWER TRAIN OF A VEHICLE HAVING AN AUTOMATED MANUAL SHIFT TRANSMISSION

(75) Inventors: Christian Rieger, Bischweier (DE); Juergen Gerhart, Appenweier (DE); Mario Jung, Sinzheim (DE); Martin Vornehm, Buehl (DE)

(73) Assignee: LUK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 10/739,703

(22) Filed: Dec. 18, 2003

(65) Prior Publication Data
US 2004/0147367 A1    Jul. 29, 2004

Related U.S. Application Data

(63) Continuation of application No. PCT/DE02/02304, filed on Jun. 24, 2002.

(30) Foreign Application Priority Data
Jun. 27, 2001    (DE) ................. 101 30 874

(51) Int. Cl.
*B60K 41/02*    (2006.01)
(52) U.S. Cl. ........................ 477/171; 477/74
(58) Field of Classification Search ............ 477/170–1, 477/176, 74, 95, 156; 192/220
See application file for complete search history.

(56) References Cited

U.S. PATENT DOCUMENTS

| | | | |
|---|---|---|---|
| 5,630,772 A * | 5/1997 | Tsukamoto et al. ............ 477/95 |
| 5,700,227 A | 12/1997 | Kosik et al. ................. 477/171 |
| 5,916,061 A * | 6/1999 | Koyama et al. ............. 477/171 |
| 5,941,792 A | 8/1999 | Amendt et al. ................ 477/74 |
| 6,033,340 A * | 3/2000 | Amendt et al. ................ 477/77 |
| 6,086,508 A | 7/2000 | Kosik et al. ................... 477/74 |
| 6,113,515 A * | 9/2000 | Salecker et al. .............. 477/74 |

FOREIGN PATENT DOCUMENTS

| | | |
|---|---|---|
| DE | 3823387 | 1/1980 |
| DE | 19530612 | 2/1997 |
| DE | 19751225 | 5/1998 |
| DE | 10029618 | 1/2001 |
| DE | 29624259 | 5/2001 |
| EP | 0375162 | 6/1990 |
| GB | 2221969 | 2/1990 |

* cited by examiner

*Primary Examiner*—Roger Pang
(74) *Attorney, Agent, or Firm*—Davidson, Davidson & Kappel, LLC

(57) ABSTRACT

A method for altering the coupling torque of a coupling in the drive train of a vehicle with an automatic gearbox and/or automatic coupling in a creep drive mode of a vehicle. According to the invention, the coupling torque is altered according to at least one variable, the parameter of the vehicle describing the creep drive mode thereof.

2 Claims, 2 Drawing Sheets

METHOD FOR CHANGING THE CLUTCH TORQUE IN A CLUTCH IN THE POWER TRAIN OF A VEHICLE HAVING AN AUTOMATED MANUAL SHIFT TRANSMISSION

CROSS-REFERENCE TO RELATED APPLICATIONS

This is a continuation of International Application No. PCT/DE02/02304, filed Jun. 24, 2002, and claims priority to German Patent Application No. 101 30 874.4, filed Jun. 27, 2001, both applications hereby being incorporated by reference herein.

BACKGROUND INFORMATION

The present invention relates to a method for changing the clutch torque of a clutch in the power train of a vehicle having an automated manual shift transmission and/or an automated clutch in a creep drive mode of the vehicle. The present invention also relates to a method for changing the clutch torque of a clutch in the power train of a vehicle having an automated manual shift transmission and/or an automated clutch to establish the biting point of the clutch.

When a vehicle having an automated manual shift transmission and/or an automated clutch is moved in a creep drive mode to park in a parking space, for example, it must be ensured that the drive motor is not brought to stop by the driver of the vehicle during a braking procedure. For this purpose, opening the clutch when the driver actuates the brake of the vehicle is already known, it being possible to monitor the brake light switch in order to monitor the braking procedure. Therefore, digital information exists on whether the brake is actuated and the clutch must therefore be opened in order to avoid the engine dying because of the braking torque exerted on the engine.

However, when the driver only wishes to brake a little against a creep torque transmitted by the clutch during maneuvering, this procedure corresponds to a different driver intent than the sharp braking by the driver in order to avoid a collision during the parking procedure, for example.

By monitoring the engine speed, it is possible to activate more rapid opening of the clutch if the instantaneous engine speed falls below the engine-specific idle speed for a predetermined period of time. However, if a diesel engine is used as the drive motor, it reacts significantly more rapidly than a gasoline engine to a reduction in the engine speed, through an increase in the engine torque output because of the combustion, so that a noticeable drop in the engine speed may not be perceived, but rather the driver of the vehicle would perceive a push of the engine against his braking intent.

For the adaptation of the touch point or biting point of the clutch, exploiting the reaction of the engine in the event of an activation of the clutch using touch ramps when the brake is actuated is known. For this purpose, a low clutch torque is built up with an initially open clutch and the torque output by the engine is monitored. If the engine torque increases by a specific value over a specific period of time in relation to the engine torque before the touch point adaptation, then the biting point established by the clutch controller must be corrected in the open direction. For such a procedure, it is possible that the vehicle will roll free if the brake is only lightly actuated.

BRIEF SUMMARY OF THE INVENTION

The present invention is thus based on an object of providing a method for changing the clutch torque of a clutch in the power train of a vehicle having an automated manual shift transmission and/or an automated clutch in a creep drive mode which remedies the disadvantages described. In addition, the method for establishing the biting point of the clutch may also be improved.

According to the present invention, a method is thus provided for changing the clutch torque of a clutch in the power train of a vehicle having an automated manual shift transmission in a creep drive mode of the vehicle, according to which the clutch torque is changed as a function of at least one variable operating parameter of the vehicle which describes the creep drive mode of the vehicle. Very generally, this means that according to the present invention, one or more operating parameters of the vehicle are monitored which describe a slow drive mode or creep drive mode of the vehicle and, as a function of the operating parameter(s), the torque transmitted by the clutch is changed. Therefore, the creep drive mode of the vehicle may be improved in relation to the known method without the danger of the engine dying, since no longer only digital information in the form of the brake light switch is analyzed, but rather one or more operating parameters, which do not change digitally and which describe the creep drive mode of the vehicle, are analyzed.

Therefore, for example, in the event that there is a danger of the engine dying, the clutch torque may first be reduced at a relatively high speed, as a function of the operating parameter(s), and the clutch torque may then be reduced at a lower speed, so that, compared with a linear reduction of the speed of the clutch torque, a more comfortable creep drive mode is available that takes the driver's intent, which may be represented by an actuation of varying strength of the vehicle brake by the driver, for example, into consideration.

Therefore, according to one aspect according to the present invention, the operating parameter is the strength of the actuation of a vehicle brake which influences the speed of the vehicle. The strength of the actuation of the brake of the vehicle by the driver may therefore be considered, i.e., for example, the brake pressure for a hydraulic braking system or a current value, using which an electromechanical brake of the vehicle is actuated. In the event of a strong actuation of the brake by the driver, according to the present invention, the clutch is opened more rapidly and the clutch torque is therefore reduced more rapidly, since otherwise a braking torque would be transmitted via the transmission to the engine via the still closed or partially closed clutch, so that the engine speed would fall too greatly. A further reduction of the clutch torque may then occur at a lower speed, so that the comfort in the creep drive mode is improved and the creep drive mode is prolonged. Such behavior then corresponds to the behavior of a vehicle having a stepped automatic transmission.

Therefore, according to a further aspect according to the present invention, the operating parameter is the rotational speed and/or the engine torque and/or a variable of the drive motor of the vehicle derived therefrom. If a drop in the engine speed is perceived during the creep drive mode, due to a braking procedure initiated by the driver, for example, which leads to an engine speed significantly below the engine-specific idle speed for a predetermined duration, i.e., to a reduction of more than 100 rpm below the idle speed, for example, according to the present invention the clutch torque is reduced using a higher gradient than would be necessary in the event of lighter braking by the driver. In a similar way, the clutch torque is reduced more strongly if it is observed that the engine torque resulting from the combustion increases during braking significantly over a value of the engine torque typical for the idling of the engine. This typical value may be established as an average of the engine torque during creep before the actuation of the brake, for example. If an electric motor or a hybrid drive is used as the drive motor, the average value of the torque output during the creep drive mode before the actuation of the brake may also be established in a similar way.

Therefore, the typical torque behavior of the drive motor in idle is analyzed. If the engine reacts to braking with a significant increase in the torque, which may mean an increase to a value of more than 10 Nm, for example, the clutch torque is then reduced rapidly and the clutch is transferred into a slipping state. In this state, the clutch transmits a lower braking torque to the engine, and the engine torque for maintaining the idle speed no longer increases. The clutch torque may then be reduced using a lower gradient, having a value of 5 Nm/sec, for example.

In a similar way, according to the present invention, the clutch torque is reduced using a higher gradient if a drop in the engine speed is observed with an essentially negative gradient. Such a case exists, for example, when the engine speed is reduced using a gradient of 25 rad/s$^2$, for example, which approximately corresponds to a reduction in the engine speed at a value of 250 rpm/sec.

According to a further aspect according to the present invention, the operating parameter is a rotational speed differential between the clutch input side and the clutch output side. This may be a rotational speed differential between the engine speed and the transmission input shaft speed, for example.

The method according to the present invention may also be advantageously used in power trains in which the clutch is not positioned between a drive motor and the transmission input, but rather at the output of the transmission or inside the transmission, for example. Thus, for example, positioning the clutch between a shaft and the transmission housing, in the event of which the clutch may act as a brake, or even, in transmissions with branched structures, positioning the clutch between two branches inside the transmission, is also possible. The action of the clutch and/or the brake on the engine then corresponds to the application in which the clutch is positioned between the engine and the transmission input.

In this case, it is provided according to the present invention that the clutch torque is reduced with a stronger approach when there is no essential rotational speed differential, since the clutch then does not yet operate with a significant slip. Therefore, the clutch is transferred more rapidly into a slipping state, through which the braking torque exerted on the engine via the clutch is reduced and the vehicle moves further in the creep drive mode. The clutch torque may then be reduced further at a rate of 5 Nm/sec, for example. Therefore, maneuvering which is comfortable for the driver may be implemented using the actuation of the brake against the creep torque. Through the initially great reduction in the clutch torque, the braking torque exerted on the engine is lower than the output torque provided by the engine in idle mode, so that the danger of the engine dying is eliminated and the driver may maneuver comfortably using the actuation of the brake.

According to a further aspect according to the present invention, the operating parameter is an accelerator pedal value. Therefore, if the brake and accelerator pedal or gas pedal are actuated simultaneously, a clutch torque may be set which allows the curb to be approached comfortably and is a function of the strength of the actuation of the brake and the accelerator pedal.

Using the change in the clutch torque as a function of at least one operating parameter of the vehicle provided according to the present invention, comfortable torque tracking may also be implemented. For this purpose, a driver's intent expressed by the actuation of the brake may advantageously be analyzed, since it may be assumed therefrom that there is a high probability that the driver wants to stop or he wants to cause a downshift action of the automated manual shift transmission if he actuates the brake of the vehicle strongly. The shifting time may be shortened if the minimum torque to be transmitted by the clutch is reduced starting from a specific threshold value of the strength of actuation of the brake, so that the opening of the clutch occurs rapidly. Therefore, it is also provided according to the present invention that the minimum torque and, in the course of the torque tracking, the torque to be transmitted by the clutch is reduced starting from a predetermined threshold value of the strength of the actuation of the brake of the vehicle, since the time necessary for opening the clutch is therefore reduced. It is possible in this case to perform the reduction of the minimum torque over multiple steps on the basis of multiple threshold values or even as a function of a brake pressure gradient.

The information obtained according to the method described above may also be used for the touch point adaptation.

According to one aspect of the present invention, a method is therefore also described for changing the clutch torque of a clutch in the power train of a vehicle having an automated manual shift transmission to establish the biting point of the clutch, in which the biting point established is shifted in the direction of an open clutch if the total torque of the engine torque and the engine moment of inertia exceeds a threshold value in the event of a reduction of the engine speed.

If it is determined during a braking action that the engine torque output by the engine plus the torque resulting from the reduction of the engine speed increases significantly, advantageously by more than 20 Nm, above a value characteristic for the idling of the engine, then, according to the present invention, the biting point of the clutch established by the controller is shifted toward the direction of the open clutch. This biting point established in this way is then used as the future biting point.

In a similar way, the biting point established is shifted in the direction of an open clutch if a rotational speed differential between the engine speed and the transmission input shaft speed is detected which is greater than a threshold value and the total torque exceeds the threshold value. Therefore, upon recognition of clutch slip and the sum of engine torque and engine moment of inertia being exceeded, the software biting point and/or the biting point established by the controller is shifted in the direction of the open clutch, and the controller will therefore disengage the clutch further in the future, since the biting point previously established as the setpoint value was too low in spite of slip in the clutch and the engine, in particular a diesel engine, has reacted thereto with a torque increase.

According to a refinement of the present invention, the biting point established is shifted in the direction of an open clutch if the rotational speed differential was detected, i.e., clutch slip has occurred for the first time and the engine speed falls below the idle speed. This variant is preferably applicable for a gasoline engine.

Very generally, it is therefore provided according to the present invention that the biting point established is shifted in the direction of an open clutch as a function of at least one operating parameter of the vehicle. This may also be the temperature of the clutch, for example.

According to the present invention, a further creep function of the vehicle is provided in such a way that the clutch torque is set to a further creep torque to maintain a creep drive mode if the accelerator pedal and the brake of the vehicle are not actuated. Therefore, an existing creep drive mode of the vehicle is maintained at the same level, for example during parking, if the driver does not operate the brake and the accelerator pedal.

According to the present invention, the further creep torque may be set in all gear stages, i.e., not only in the starting gears, for example the first and second gears as well as the reverse gear, but rather in all gear stages or driving stages provided by a transmission coupled to the clutch. This further creep torque may then be reduced if, on the basis of a rotational speed differential at the clutch causing the further creep drive mode, it is determined that clutch slip exists and therefore the output torque provided by the engine is no longer sufficient to maintain the further travel. Maintaining the further creep torque would then only lead to heating of the clutch because of increasing friction power.

BRIEF DESCRIPTION OF THE DRAWINGS

The present invention is described in greater detail in the following on the basis of the drawing.

DETAILED DESCRIPTION

Figure 1:
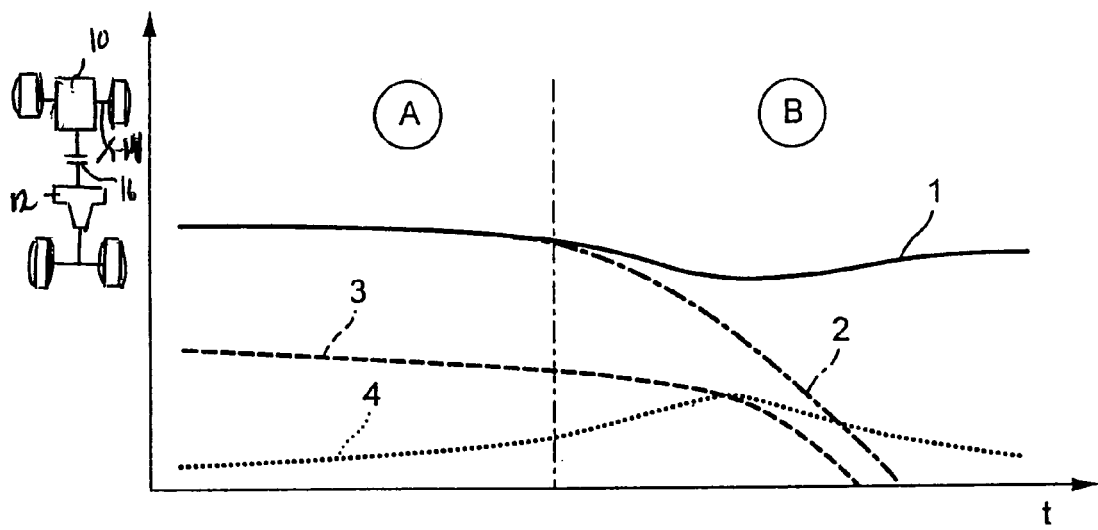
FIG. 1 shows a diagram with a schematic illustration of the change in the clutch torque.

FIG. 1 of the drawing shows a schematic illustration of the change in the clutch torque as a function of the strength of the actuation of the brake by the driver of the vehicle.

This is a qualitative illustration, using which the method according to the present invention is to be explained. The region identified with A shows curves when the driver of the vehicle brakes only lightly, while the region identified with B shows curves in the event of strong braking.

In region A, engine speed 1 of engine 10 and transmission input shaft speed 2 of transmission 12 run largely uniformly and fall slightly due to the light braking action on brake 14. Clutch torque 3 of clutch 16 also falls slightly, while engine torque 4 of engine 10 increases slightly. The clutch is closed and operates essentially without slip. This may be the situation when parking.

If the driver now actuates the brake more strongly, it is provided according to the present invention that clutch torque 3 is reduced with a higher gradient than is the case in the event of light braking, as shown in region A. The engine has reacted to the stronger braking during the creep drive mode with an increase in engine torque 4, whereupon clutch torque 3 is reduced using increasing gradients. Through the braking action, engine speed 1 is reduced, but clutch torque 3 has already been reduced significantly more strongly. Transmission input shaft speed 2 falls significantly, and the engine no longer has a high braking torque applied to it. Since the rotational speed drop of the engine comes to an end, the engine no longer reacts with an increase in engine torque 4, and torque curve 4 drops further.

Although the case of an initially light braking action followed by a stronger braking action is illustrated in FIG. 1, the reverse case may also exist, in which the driver initially brakes more strongly and then reduces the braking force. In this case as well, the clutch torque is reduced with a higher gradient during the stronger braking action than during a lighter braking action.

Figure 2:
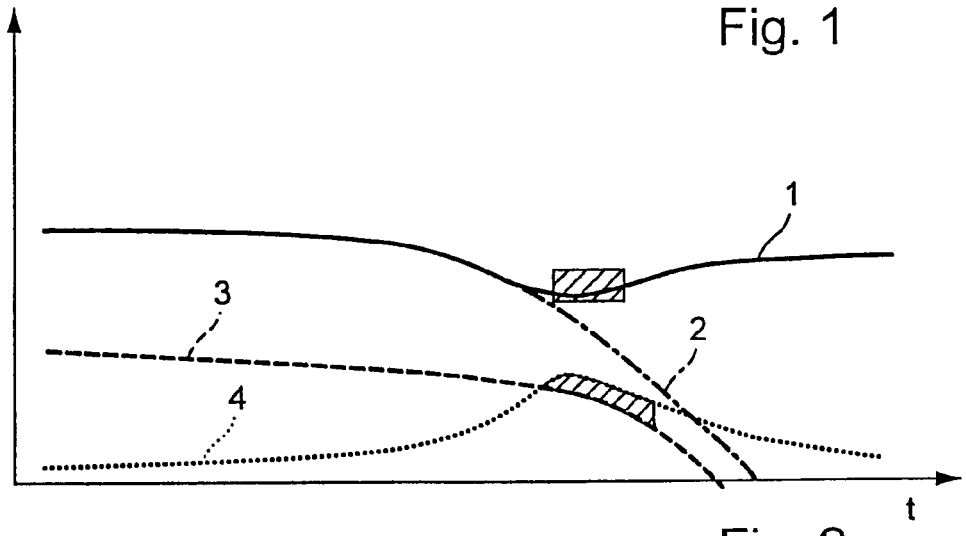
FIG. 2 shows a diagram with a schematic illustration of the change in the clutch torque in the event of the biting point adaptation if the biting point is too low.

FIG. 2 shows curves for a biting point of the clutch that has been established too low by the controller. The region with a gray background shows that engine speed 1 falls greatly and the engine reacts with a significant increase in engine torque 4 and attempts to compensate for the drop. Clutch torque 3 has already been significantly reduced, the clutch slips, and engine torque 4 nonetheless rises. The biting point used by the controller of the clutch as the setpoint biting point is too low and is to be shifted in the direction of an open clutch.

Figure 3:
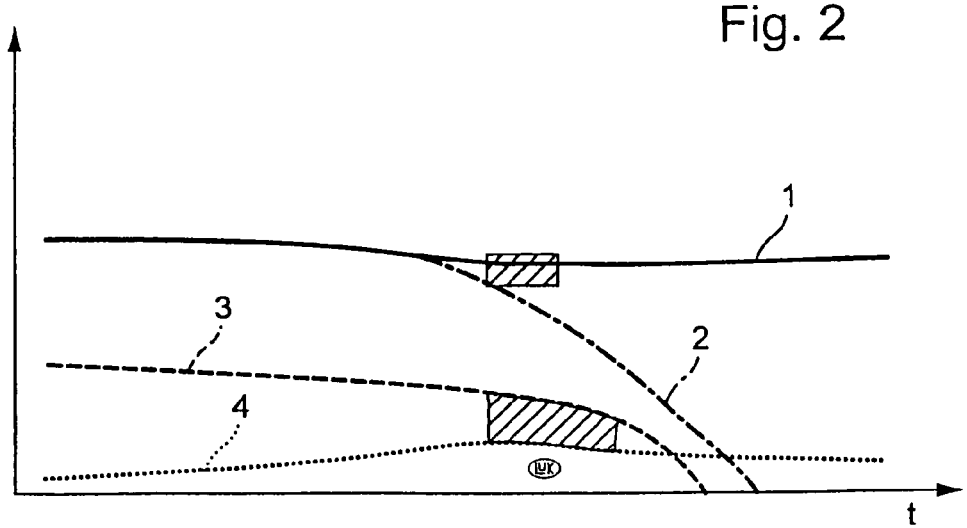
FIG. 3 shows a diagram similar to FIG. 2 and a biting point that is too high.

FIG. 3 shows curves in the event of a biting point of the clutch that has been established too high by the controller. The region with the gray background shows that engine speed 1 remains unchanged in the adaptation time, i.e., the clutch is already open too far. The controller of the clutch has therefore set a setpoint biting point that is too high. The new setpoint biting point of the clutch is therefore to be shifted in the direction of a closed clutch.

Figure 4:
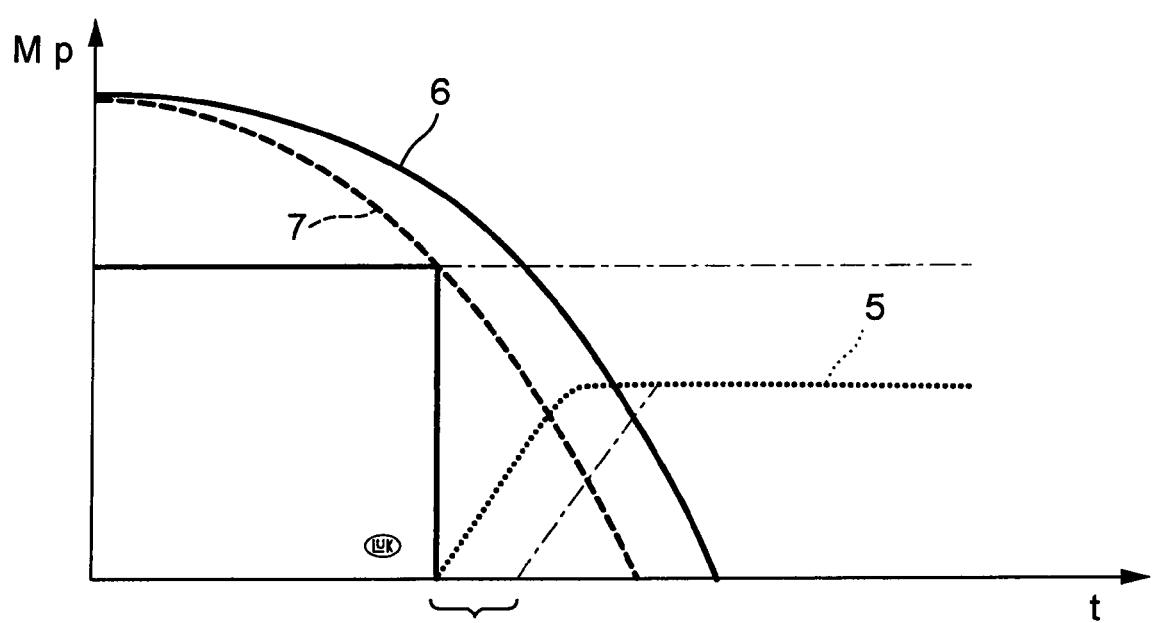
FIG. 4 shows a diagram with the curve of the clutch torque in the creep drive mode.

Finally, FIG. 4 of the drawing shows a diagram with the curve of the clutch torque in the creep drive mode. The creep torque may be between 10 Nm and 15 Nm, depending on the vehicle, and is high enough that the vehicle moves at a low speed. The creep torque is set at the clutch if the first gear, the second gear, or the reverse gear is engaged, the brake is not actuated, and the accelerator pedal is also not actuated.

The method provided according to the present invention thus differs from the method previously described having ramped buildup to the biting point in that a clutch torque which is a function of the strength of the actuation of the brake is built up in such a way that the creep torque is already set starting from a specific threshold value, i.e., the clutch is already somewhat closed starting from the threshold value. Therefore, according to the present invention, the signal indicating the strength of the actuation of the brake is filtered in order to take possible signal noise into consideration.

Creep torque 5 is changed as a function of the operating parameter of brake pressure in the example shown in FIG. 4, in such a way that it is built up even at a still existing filtered brake pressure 6, which results from brake pressure 7. Therefore, a significantly better ability to meter the creep torque is achieved than was the case in the previous ramped buildup of the creep torque, in which the creep torque was first built up when the brake light switch of the vehicle signaled release of the brake. Through the buildup of the creep torque as a function of the brake pressure, it is possible to approach the curb comfortably when the vehicle is on a slope.

Instead of the operating parameter of brake pressure or the strength of the actuation of the brake, a gradient thereof may also be used as a parameter for the change in the clutch torque. Thus, for example, the clutch torque may be increased rapidly if the brake pressure gradient is high and the driver initiates a gear change action, since it may be assumed therefrom that the driver wishes to use the engine drag torque for braking.

Besides the signal representing the strength of the actuation of the brake, the digital brake light switch signal is also still available for analysis. This may be transmitted to the control unit via the CAN (controller area network) bus of the vehicle. If there is a further redundant brake light switch signal, a plausibility check of the signal may be performed and a source of error may be concluded in such a way that if there is no brake light switch signal transmitted outside the CAN bus, for example, a line interruption may be concluded. In the event of an implausible CAN signal, a defective control unit may be concluded, while in the event of an implausible brake pressure signal, a defect of the brake pressure sensor may be concluded.

What is claimed is:

1. A method for changing a clutch torque of a clutch in a power train of a vehicle having an automated manual shift transmission and/or an automated clutch in a creep drive mode of the vehicle, the method comprising the steps of:

monitoring a strength of a vehicle brake actuation during the creep mode; and reducing the clutch torque as a function of the strength of the vehicle brake actuation; wherein the clutch torque is reduced at a first rate when the strength of the vehicle brake actuation is below a certain threshold and at a second rate faster than the first rate when the strength of the vehicle brake actuation is above the certain threshold.

2. The method as recited in claim 1 wherein the clutch torque is set to a further creep torque to maintain a creep drive mode if an accelerator pedal and a brake of the vehicle are not actuated.

* * * * *